US006876658B2

(12) United States Patent
Epley

(10) Patent No.: US 6,876,658 B2
(45) Date of Patent: Apr. 5, 2005

(54) COMMUNICATIONS SYSTEM AND METHOD USING PARTIALLY NON-GEOGRAPHIC ADDRESSING METHOD FOR FORMING SAME

(75) Inventor: Robert V. Epley, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 709 days.

(21) Appl. No.: 09/735,379

(22) Filed: Dec. 12, 2000

(65) Prior Publication Data

US 2001/0014094 A1 Aug. 16, 2001

Related U.S. Application Data

(63) Continuation of application No. 08/997,709, filed on Dec. 23, 1997.

(51) Int. Cl.[7] .............................................. H04L 12/28
(52) U.S. Cl. ................................... 370/395.1; 455/419
(58) Field of Search .............................. 370/395.1, 396, 370/410, 522, 221.13; 455/411, 419

(56) References Cited

U.S. PATENT DOCUMENTS

| | | | | |
|---|---|---|---|---|
| 5,077,790 A | * | 12/1991 | D'Amico et al. | ........... 455/411 |
| 5,506,847 A | | 4/1996 | Shobatake | |
| 5,603,084 A | * | 2/1997 | Henry et al. | ................. 455/419 |
| 5,701,300 A | | 12/1997 | Jeon et al. | |
| 5,956,636 A | * | 9/1999 | Lipsit | .......................... 455/419 |
| 6,493,327 B1 | * | 12/2002 | Fingerhut | ................... 455/419 |
| 6,603,764 B1 | * | 8/2003 | Epley | ...................... 370/395.1 |
| 6,636,489 B1 | * | 10/2003 | Fingerhut | ................... 455/419 |

FOREIGN PATENT DOCUMENTS

WO   WO 96/38961   5/1996

OTHER PUBLICATIONS

Ushijima, S. et al., "Portable IP Service Over Closed User Group by ATM–Based Connectionless Service," *Global Information Infrastructure (GII) Evolution: Interworking Issues, Interworking '96, 3rd International Symposium on Interworking* NARA (Japan), Oct. 1–2, 1996, pp. 493–502.
Jain, R. et al., "Phone Number Portability for PCS Systems with ATM Backbones Using Distributed Dynamic Hashing," *IEEE Journal on Selected Areas in Communications*, vol. 15, No. 1, Jan. 1997, pp. 96–105.
International Search Report issued by the European Searching Authority of the PCT (ISA) on Mar. 24, 1999.

* cited by examiner

*Primary Examiner*—Salvatore Cangialosi
(74) *Attorney, Agent, or Firm*—Thomas, Kayden, Horstemeyer & Risley, LLP

(57) ABSTRACT

A communications process and apparatus is provided with scoped, partially non-geographic addressing. The processes are carried out by one or more switches in a communications system. A first device in the system has a scoped address, including at least one geographic identifier and a customer identifier. A second device sends a setup message with addressing information to a switch in the system. The switch examines the message and consults a database with the customer identification to determine forwarding information. The switch forwards the message to a second device according to the forwarding information obtained from the database. The second device sends a connect message to the first device, thereby establishing a connection.

44 Claims, 3 Drawing Sheets

COMMUNICATIONS SYSTEM AND METHOD USING PARTIALLY NON-GEOGRAPHIC ADDRESSING METHOD FOR FORMING SAME

CROSS REFERENCE TO RELATED APPLICATION

This application is continuation and claims priority to, and incorporates in fall by reference, Applicant's co-pending non-provisional patent application having U.S. Ser. No. 08/997,709, filed Dec. 23, 1997.

FIELD OF THE INVENTION

This invention relates to systems and methods for addressing, signaling and communicating in a communications network. Particularly, this invention relates to systems and methods for addressing, signaling and communicating in communications networks using scoped addressing.

BACKGROUND OF THE INVENTION

Conventional communications networks require procedures and products that dynamically establish and maintain connections between devices attached to the network through signaling. It is important for such signaling to be, among other things, flexible and responsive to the needs of the network and the customers of that network. Addressing plays an important role in signaling, and provides the means for structure and order in conventional networks and the signaling that is carried out therein.

Asynchronous Transfer Mode ("ATM") is an increasingly popular standard for high-speed communication. An information stream, whether it be data, voice, video or other type of information, is divided into packets called "ATM cells." Each ATM cell is fifty-three (53) bytes in length. An ATM cell comprises two main sections, a header, which is five bytes in length, and a payload, which is forty-eight bytes in length. The payload includes or corresponds to at least part of the subject information stream. The header includes information corresponding to a path to a desired destination, or endpoint, for the cell.

An ATM System typically comprises three architecture layers. An "Adaptation layer" divides information that it receives, whether it be data, voice, video or other type of information, into one or more (as needed) forty-eight byte payloads. An "ATM layer" adds a five-byte header comprising addressing information to each forty-eight byte payload. Once joined together, the five-byte header and the forty-eight byte payload comprise an ATM cell. A "Physical layer" converts the ATM cell to appropriate electrical, optical, or other format for physical transport.

The header comprises a virtual path identifier (VPI) and a virtual channel identifier (VCI). Within a typical ATM system, virtual connections are established between system elements as needed according to the VPI and VCI contained in the header. The header provides information which facilitates virtual connections between network elements.

For an introduction to ATM, see David E. McDysan & Darren L. Spohn, *ATM Theory and Application* (McGraw-Hill, Inc. 1995), the disclosure of which is incorporated herein by reference. For a further introduction to ATM and a description of various standards and specifications related to ATM, see The ATM Forum Technical Committee, *User-Network Interface (UNI) Specification Version* 3.1 (1994), the disclosure of which is incorporated herein by reference.

In a conventional ATM network, each ATM connected endpoint, or point of attachment, which can be a device such as a telephone, computer, or video monitor, for instance, has an address. In one embodiment of such a network, when a first ATM device wishes to establish a connection with a second ATM device, the first ATM device sends a SETUP message to the ATM switch connected to it ("first ATM switch"). This message includes addressing information, in digital form, including the ATM address of the second ATM device. This first ATM switch examines the SETUP message. In particular, this first ATM switch examines the included address of the second ATM device. This first switch determines which switch in the network the SETUP message should be sent to next (assuming that the first switch is not directly connected to the second ATM device) and forwards the message to a second switch. Similarly, the second switch examines the SETUP message and determines which switch in the network the message should be send to next (same assumption) and forwards the packet to a third switch. This process continues until the SETUP message arrives at the second ATM device (or "endpoint").

When the SETUP message arrives at the second ATM device, and if the device can support the desired connection, the second ATM device returns a CONNECT message to the first ATM device. As the CONNECT messages returns through the network switches back to the first ATM device, the switches set up a virtual connection, or virtual circuit, between the first ATM device and the second ATM device. In a conventional network, a CONNECT message includes the VPI/VCI values that the first ATM device should use for ATM cells that it wishes to send to the second ATM device. These VPI/VCI values are integrated into the ATM cells at the first ATM device.

Several ATM address formats have been developed. The references cited above describe these AESAs in detail. Conventional public addresses are based upon the ITU-T E.164 format (or "native E.164" format). This format is generally an Integrated Services Digital Network (ISDN) telephone number. For example, a native E.164 address for a telephone in the Atlanta, Ga. area might be 14045551212. This number, by its 404 numbering plan area (or "NPA") designation, is a geographic address indicating the Atlanta, Ga. area. The native E.164 address is based on the geographical location of the user. The digits of such an address generally includes the area code and, for international calls, the country code. The length of a native E.164 address is variable, depending upon, for example, whether the call made is an international call.

Conventional private ATM addresses are known as ATM End System Addresses (AESAs). AESAs are fixed in length at twenty (20) bytes. The ATM Forum supports at least three conventional AESA formats: E.164 AESA, Data Country Code (or "DCC") AESA, and International Code Designator (or "ICD") AESA. These formats are discussed herein as they relate to, and are used in, the United States.

In all three formats, the first thirteen (13) bytes are called the "network prefix" and the second seven (7) bytes are called the "user part." In all three formats, the first byte of the network prefix (also the first byte of the AESA) is used for an authority and format identifier (or "AFI"). The AFI identifies which addressing scheme is found in the subsequent nineteen bytes. The E.164 AESA is identified by an AFI value of 45 (hex), the DCC AESA is identified by an AFI value of 39 (hex), and the ICD AESA is identified by an AFI value of 47 (hex).

Also, in all three formats the last seven (7) bytes of the twenty (20) byte address comprises a six (6) byte end system identifier (or "ESI") and a one (1) byte selector (or "SEL").

Conventionally, the ESI is an IEEE 802 Media Access Control (or "MAC") address. Incorporation of the MAC address into the AESA often simplifies the task of mapping AESAs into existing local area networks (or "LANs"). In a typical ATM system, the ESI of an end system is unique for a particular network prefix and is found in the ATM adapter card of the end system. The ESI and the network prefix combine to form a unique nineteen (19) byte address in the network.

In the DCC and ICD formats, the first two (2) bytes following the AFI comprise the initial domain identifier (or "IDI"). The IDI specifies the authority responsible for allocating the subsequent portion of the AESA. In the DCC and ICD formats, the last seventeen (17) bytes is called the domain specific part (or "DSP") in order to indicate that that portion of the AESA is the portion structured by the authority indicated in the IDI.

The E.164 AESA is based upon the native E.164 format. After the AFI, the next eight (8) bytes comprise a native E.164 address, which is typically an ISDN telephone number. For example, the eight bytes referred to may be comprised of "000014045551212F". In conventional telecommunications networks using the E.164 AESA, the service provider administers the native E.164 address portion of the E.164 AESA.

The DCC AESA is independent of the native E.164 format. In DCC AESAs, the IDI comprises a two (2) byte data country code. As mentioned above, the DCC AESA and other formats are discussed herein as they relate to, and are used in, the United States, and thus the discussion related to the DCC AESA is ANSI specific. Following the two (2) bytes comprising the IDI is a single-byte DSP format identifier (or "DFI"). The DFI identifies the format of the remainder of the DSP. The three (3) bytes following the DFI comprise the administrative authority (or "AA") field. The value of the AA field indicates which authority administers the remainder of the DSP, also called the high order domain specific part (or HO-DSP). The HO-DSP is typically structured hierarchically to reflect the network topology or address authorities. An administrative authority may obtain a DCC AESA prefix from, for example, ANSI.

The ICD AESA, like the DCC AESA, is independent of the native E.164 format. The ICD AESA addressing scheme discussed herein is a conventional plan used by BellSouth. In ICD AESAs, the IDI comprises a two (2) byte code for an organization which is responsible for allocating and/or administering the remainder of the AESA. To illustrate a possible layout for the 10 byte HO-DSP, a layout similar to BellSouth's will be described. The first half byte of a HO-DSP of an ICD address comprises reserved, administrative information. The next 1.5 bytes comprise a country code (also called a country field). For example, the country code for the United States is 840. The next byte comprises a region or state code. State codes are listed in FIPS 5-2. For example, the state code for Georgia is 13. The next byte comprises subregion information. In the United States, this field is an encoding of the NPA within a particular state. The next byte comprises the wire center field (also called a switch code). In the United States, this field is a one (1) byte encoding of the wire center within a particular subregion/NPA. This field indicates the wire center containing the switch, which may be the wire center that provides narrowband telephony service to the customer. The next two bytes comprise the termination field. Each customer has an assigned termination field number. The final three bytes comprise the customer part of the HO-DSP. For directly attached customers, this field is set at a value of zero (0). For private network customers, the customer administers this field.

For example, the following string shows a sample encoding of a complete 40 character ICD AESA: 47.0109.0.840.13.02.01.003B.000477.5A29E08443B1.00 (the periods shown in the string are to aid in reading the string only). The AFI field is 47 and the IDI field is 0109. The HO-DSP is 0.840.13.02.01.003B.000477. The administrative portion of the HO-DSP is 0, the country field is 840, which is the code for the United States, and the state code is 13, which is the code for Georgia. The subregion code is 02, the switch code is 01, and the termination field is 003B. Finally, the customer part is 000477.

As can be seen, conventional native E.164 addresses and E.164 AESAs comprise hierarchical, scoped, geographic-based addresses. Although independent of the native E.164 format, conventional DCC and ICD addresses likewise are expected to be administered and deployed as hierarchical, scoped, geographic-based addresses. Conventional addresses are geographically hierarchical in that such addresses contain information about the geographic location of the customer's point of attachment or the customer's switch. Such addresses indicate the physical location of their associated endpoints by multiple-level geographic indicators. Such indicators may be of decreasing geographic scope, i.e., the first field is descriptive of a broader geographical scope, e.g., the United States, than the field following it, e.g., Georgia, which in turn is descriptive of a broader geographical scope, e.g., the 404 area code, than the field following it. The geographic information aids the routing of a call through switches in a communications system to the destination indicated by the address.

Conventional geographic addresses are well-defined hierarchically by geography. For example, in conventional telephone numbers, the first field indicates a country code, the second field indicates a region, generally an area code, the third field indicates a particular exchange, and the fourth field indicates a customer coupled to that exchange. This offers an advantage in that such addresses allow communications systems that are easy to manage. Another advantage is that geographic addresses can be easily summarized so that non-local routing can be based upon a small amount of information. For example, all calls to a non-local NPA can be handed to an interexchange carrier, regardless of the remaining digits in the address.

Geographic-based addresses are contrasted with non-geographic-based addresses. Non-geographic addresses identify the customer to whom the call is to be passed. One example of a non-geographic number is an "800" number, e.g., 1-800-555-1212. An organization-based address is based upon a particular organization rather than geography. A typical Internet IP address is one example of a organization-based address. One advantage of non-geographic addresses is that large customers can connect at multiple locations, and can add to or change these connection points all with a single address prefix.

Both geographic and non-geographic addresses have disadvantages. One disadvantage of geographic addresses is that when a customer moves in physical location, the customer's address must change. Another disadvantage of geographic addresses is that large customers cannot connect at multiple locations, and then add to or change these connection points all with a single address prefix. Geographic addresses are disadvantageous also in that it is highly rigid and generally requires that customers with multiple connections to a system have multiple addresses, each indicating and related to the geographical location of the associated endpoint or connection. Another disadvantage of the conventional geographic address is that because it is hierarchical and geographical in nature, the endpoint having such an address must remain fixed to a particular physical location. One disadvantage of conventional non-geographic addresses is that all switches within the serving area must specifically know that customer's prefix or a central switch must be employed.

SUMMARY OF THE INVENTION

The present invention provides processes and apparatus for addressing, signaling, and communicating in a communications network. The processes are carried out by, and the apparatus comprises, network devices, switches, and a database. A plurality of devices connected to the system are provided. A first device has an address comprising a geographic portion and a non-geographic portion. The geographic portion comprises geographic identifiers to indicate the location of the first device within a predetermined geographic region. The non-geographic portion of the address comprises a customer identifier. A second device has the ability to construct a message to be transported in the telecommunications system. A plurality of switches having the ability to examine the message and to direct the message to other places in the telecommunications system is provided. A database is also provided. The database is accessible by at least one of the switches. The database contains forwarding information for various devices corresponding to the addressing information for those various devices. A message is constructed in the second device which includes addressing information corresponding to the address of the first device. The message is transported to a first switch. The switch accesses the database to determine forwarding information corresponding to the addressing information. The switch then forwards the message to a device corresponding to the forwarding information.

The present invention offers the advantage of a common address structure to provide both partially-geographic and partially-organization-based addresses. Another advantage of the present invention is that it allows organization-based addresses to be offered and used with a geographic scope inherent in the address.

Another important advantage of the present invention is that a customer can have a single address which works at multiple locations through multiple service providers, i.e., portability of address is provided. Importantly, the advantage of offering a customer movement within a given range of geography is provided. This advantage can be offered at lower cost as the customer can choose from a wide variety of geographic scopes in which it might move. Typically, a larger scope requires a higher cost because of necessary switch reprogramming and a smaller scope requires a lesser cost. The present invention provides a wide range of geographic scope choices.

Another advantage of the present invention is that it can be used in public and private networks, including ATM-based public and private networks.

Another further advantage of the present invention is that it is suitable for use in a multi-vendor environment. A related advantage of the present invention is that it is compatible with a wide variety of address formats.

Another important advantage of the present invention is that it facilitates multi-homing, i.e., providing a telecommunications network customer two or more geographically separate links to a public network such that the customer will have service if one of the links becomes inoperable.

DETAILED DESCRIPTION

Figure 1:
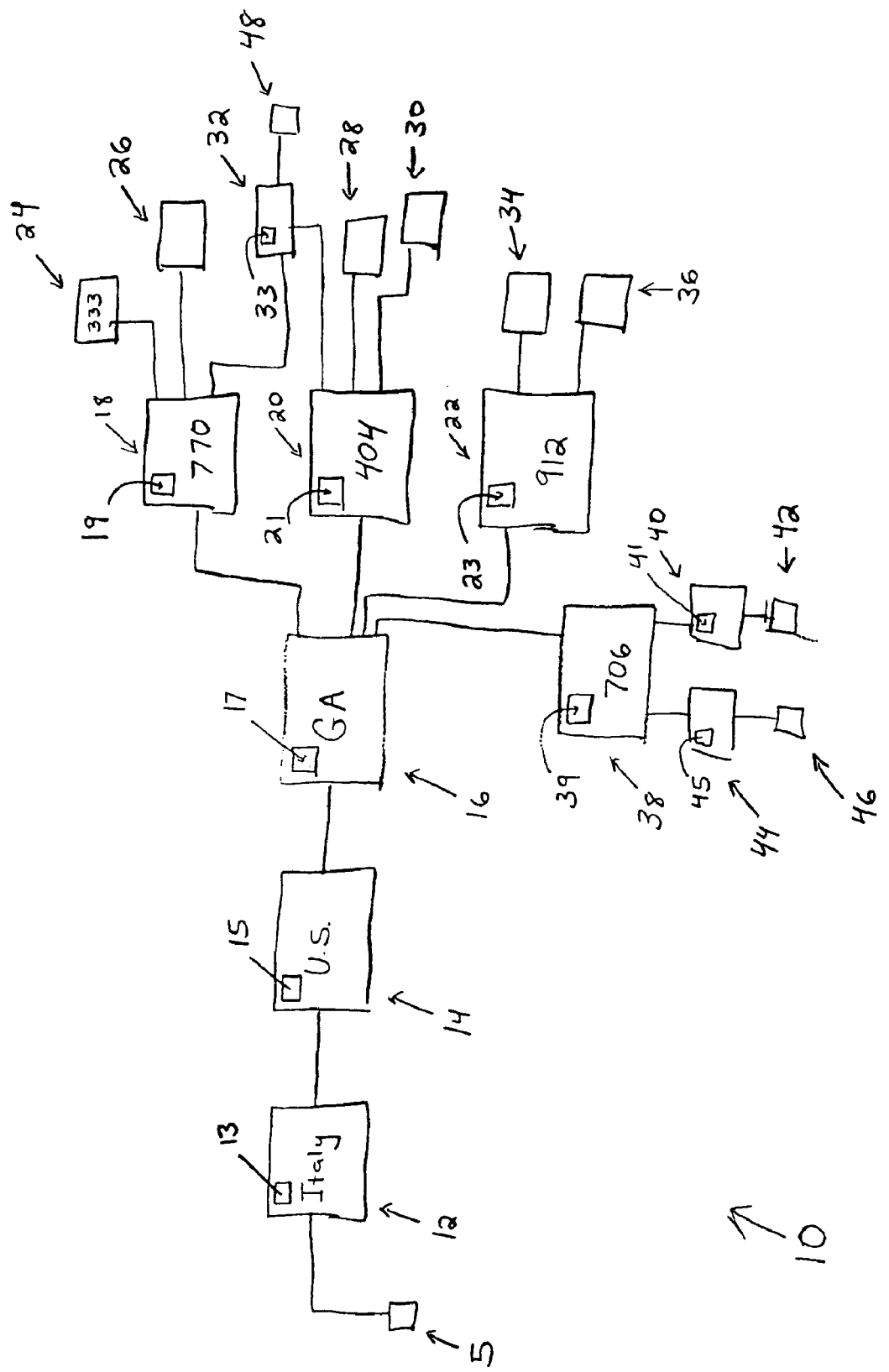
FIG. 1 is a block-diagram of a preferred embodiment of an ATM telecommunications system according to the present invention having a non-centralized database which includes routing information.

FIG. 1 shows a block diagram of an ATM Switched Virtual Connection (SVC) telecommunications network 10 according to the present invention. The blocks shown represent network elements connected as shown. The invention may be used in non-ATM telecommunications network as well. The switches shown 12, 14, 16, 18, 20, 22, 24, 26, 28, 30, 32, 34, 36, 38, 40, 44 are programmed to recognize and evaluate AESAs, including ICD AESAs. The switches shown are all assumed to be in a BellSouth network, and can be, for example, Cascade 500 switches. The switch 12 is a switch physically located in Italy. The switch 14 is a switch physically located in New York, N.Y., United States. The switch 16 is a switch physically located in Atlanta, Ga. For ease of description, one switch is shown for each conventional area code in Georgia. One switch 18 is physically located outside the metropolitan Atlanta, Ga. area, and corresponds to the currently used 770 area code. A second switch 20 is physically located in Atlanta, Ga., and corresponds to the 404 area code. A third switch 22 is located in Savannah, Ga., and corresponds to the 912 area code. A fourth switch 38 is also located outside the Atlanta, Ga. metropolitan area, and corresponds to the 706 area code. A plurality of switches 24, 26, 28, 30, 32, 34, 36, 40, 44 are shown connected to various of the four switches 18, 20, 22, 38 just described. For ease of description, each switch corresponds to an exchange within the area code associated with the switch with which it is connected. For example, switch 24 corresponds to the 333 exchange located within the 770 area code. Each of the switches has an associated database.

An ATM device, in the shown case a telephone 5, is connected to the Italy-based switch 12. Other devices, such as a computer or a video-monitor, may be used. Another ATM device, in the shown case a second telephone 42, is connected to a switch 40 in Georgia. The second telephone 42 has been assigned the following address: 47.0109.0.840.13.AA.be1111.000000.000000000000.00 (the periods within the address is shown for convenience only; the periods are not part of the actual address). The portion of the address shown as "be1111" is the customer identification field. In the address shown, "be1111" is the customer identifier. The portion of the address shown as "000000.000000000000.00" is the customer part field. These and other portions of the address are explained further herein.

The device 5 wishes to establish a connection with the second telephone 42 and constructs and sends a SETUP message to the Italy-based switch 12. The message is in a form capable of transmission in the network 10. Preferably, the message is in digital data form. The message comprises addressing information in the form of data corresponding to an ICD AESA address associated with the ATM device or customer that the device 5 wishes to contact. The address information included in the message is an address as follows: 47.0109.0.840.13.AA.be1111.000000.000000000000.00. Note that this address is the one assigned to the second telephone 42. The portion of the address shown as "be1111" is the customer identification field. The portion of the address shown as "000000.000000000000.00" is the customer part field. This customer field is typically administered by the customer and contains such information as desired by the customer. The portion of the addresses shown as "840.13.AA" includes three geographic identifiers, "840", "13", and "AA". These geographic identifiers indicate the location of the second telephone 42 within a predetermined geographic region, in this case, the state of Georgia. The use of these identifiers are explained further below. The code "AA" is in a geographic identification field and is called a geographic identifier, but is a special type of identifier called a "scoped code."

The switch 12 receives the SETUP message and examines the message. Typically, this examining is accomplished by a microprocessor or other computer. The switch recognizes that the address type is an ICD AESA because the AFI of the address is 47. The 0109 portion of the address indicates that the address is administered by BellSouth, and the addressing scheme discussed herein reflects the BellSouth addressing plan. The switch recognizes that the country code of the AESA is 840, which corresponds to the United States. Once it recognizes that the address is an United States address, the Italy-based switch forwards the SETUP message to the switch 14 located in the United States. Like the Italy-based switch, this switch 12 examines the message. The switch 14 recognizes that the address type is ICD AESA because the AFI of the address is 47. The switch recognizes that the region or state code in the AESA is 13, which the switch recognizes corresponds to Georgia. Accordingly, the switch 14 forwards the message to a Georgia-based switch 16.

Like the switches before it, the Georgia-based switch 16 examines the SETUP message. The switch 16 recognizes that the code AA is present in the subregion field. The switch 16 recognizes that the code AA is a scope code, or an alert code, which alerts the switch that the address which the switch is examining is a special, scoped address. The data AA is the scope code shown in this embodiment; any code can be chosen.

The portion of the address preceding the scope code and the scope code itself is a geographic portion of the address, indicating the geographical scope in which a device having the address might be connected to the network. The portion of the address following the scope code is a non-geographical portion of the address. This non-geographical portion includes a customer identification, e.g., as above, be1111.

The switch 16 recognizes that the point of attachment, or endpoint, associated with this address could be located in any subregion in Georgia. That is, from the scoped code AA's presence in the subregion field, the switch 16 recognizes that the endpoint could be located anywhere within Georgia and that the scope of the location of the endpoint with the address which the switch 16 is examining is the state of Georgia. Preferably, the switch recognizes that the previous field in the AESA was 13, and thus realizes that the endpoint is located within the state of Georgia. The route or path to the endpoint associated with that address could be through any one of the four switches to which the Georgia-based switch 16 is attached.

When the Georgia-based switch recognizes the AA code in the subregion field, the Georgia-based switch searches a database associated with that switch for the AESA, or for the customer identifier contained within the AESA, which it is examining. Other similar apparatus may be used to store such information, including look-up tables. The preferred embodiment shown includes a database 17. The database retrievably stores addressing information and associated forwarding information. Preferably, the addressing information retrievably stored is customer identifier data.

In the embodiment shown in FIG. 1, the database 17 retrievably stores customer identifier data and associated routing information. The switch searches a database 17 associated with switch 16 for the customer identifier contained within the message. The database provides the switch with forwarding information associated with the customer identifier. Forwarding information includes information such as information regarding how to or where to forward a message or other information or data. This includes information regarding one or more routes to a particular network element or information regarding a network element's physical location, e.g., a network address. The database 17 shown provides the switch 16 with routing information. This routing information indicates the network element (an element attached to the network), whether another switch, a device, an endpoint, or some other network element coupled to the present switch, to which the present switch should forward the SETUP message. The routing information may indicate only the next network element which the SETUP message should be forwarded to or a sequence of network elements to which the message should be forwarded. Preferably, the database is programmable.

Upon the switch's searching of the database 17 for "be1111", the database provides routing information associated with "be1111." The database 17 has been preprogrammed to store and associate the customer identifier "be1111" with routing information corresponding to forwarding the SETUP message to the switch shown as 38. This switch is associated with the 706 area code. Upon receipt of the SETUP message, switch 38 examines the message. When the switch 38 recognizes the AA code in the subregion field, the switch 38 searches a database 39 associated with that switch 38 for the customer identifier "be1111." The database provides the switch 38 with routing information associated with the customer identifier. In this case, the database provides the switch 38 with routing information corresponding to forwarding the SETUP message to the switch shown as 40. Like the previous two switches, the switch 40 examines the SETUP message, discovers the scoped code, AA, in the subregion field, and accordingly searches a database 41 associated with the switch 40 for the customer identifier "be1111." The database provides the switch 40 with routing information associated with the customer identifier. In this case, the database provides the switch 40 with routing information corresponding to forwarding the SETUP message to the endpoint, in this case a telephone, 42 and the switch forwards the message to the telephone 42.

Assuming the telephone 42 can support the desired signaling, the telephone 42 responds with a CONNECT message. As the CONNECT message returns to the originator of the request 5, the switches in the path set up a virtual circuit or virtual connection. The originator 5 receives the CONNECT message from the endpoint 42, as well as the VPI/VCI value that the originator should use for ATM cells it seeks to deliver to the endpoint 42.

Preferably, the fields of the geographic portion of the address are arranged in order of geographically-decreasing scope. This allows efficient examination of the address by successive switches.

The data contained in the tables can be updated as desired to indicate the forwarding information, including new routing information, alternative routing information, or new network addresses, associated with particular addresses. New information, or new tables, may be downloaded to desired switches periodically, at desired times, or some combination thereof.

In this case, the physical location of the device is a telephone at the headquarters of a company, Brinson Laboratories, located in Rome, Ga. Brinson Laboratories' ATM address told the originator that the scope of the geographical location of the endpoint at which the device is located is the state of Georgia. The customer portion of the address, "be1111," is non-geographic.

If Brinson Laboratories moved its headquarters outside the range of switch 40 but still within the 706 area code and to within the 02 subregion within the 706 area code, Brinson Laboratories could keep the same scoped AESA ICD address of 47.0109.0.840.13.AA.be1111.000000.000000000000. If Brinson Laboratories established a telephone connection at the point shown as 46 in FIG. 1, that telephone would be assigned this same scoped address. The service provider operating the switches in Georgia, particularly switches 38, 40, and 44 would need to change the database associated with the switches to new routing information associated with this ICD address, in particular the "be1111" portion. Consequently, in the above example, when the switch 38 consulted the database after Brinson Laboratories' move and proper programming by the service provider, the database provides routing information indicating that the path to the endpoint associated with the examined address is through the switch shown as 44. The switch 44, upon receipt of the SETUP message, examines the message and consults an associated database 45 for the customer identifier, be1111. The database 45 provides routing information indicating that the switch should forward the message to the device shown as 46. This is the new endpoint for Brinson Laboratories. Upon retrieving this routing information, the switch 44 forwards the message to the telephone 46.

Likewise, if Brinson Laboratories decided to move its headquarters to Atlanta, it could keep the same scoped AESA ICD address. If Brinson established a telephone connection at the point shown as 48, that device would be assigned the same address as shown above. The service provider operating the switches in Georgia, particularly switches shown as 16, 38, 44, 20, and 32, would need to change the associated databases 17, 39, 45, 21, 33 to reflect new routing information associated with this address, in particular the "be1111" portion. Consequently, in the above example, when the switch 16 consulted the database 17 after Brinson Laboratories' move to Atlanta and proper programming by the service provider, the database 17 would provide routing information corresponding to sending the SETUP message to the switch associated with the 404 area code shown as 20. Like the operation described above, the switch 16 forwards the message to the switch 20, which in turn examines the message and consults its associated database 21 to determine routing information associated with the address included in the message. This routing information indicates that the switch 20 should forward the message to the switch shown as 32, which the switch 20 does. The switch 32 examines the message and consult its associated database 33. The routing information provided by the database 33 indicates that the switch 32 should forward the message to the endpoint shown as 48, which the switch does. This endpoint 48 is the telephone for Brinson Laboratories which corresponds to the same address.

As one can see, the geographical scope of the endpoint associated with scoped ICD AESA address 47.0109.0.840.13.AA.be1111.000000.000000000000.00 is the state of Georgia. The endpoint can be moved physically within this scope without requiring an address change.

As another example, the geographical scope of the endpoint associated with scoped ICD AESA address 47.0109.0.840.AA.22.cd2222.000000.000000000000.00 is the United States. The code "AA" in the state field indicates that the geographic scope of the endpoint is the United States because the prior field, the country field, is "840," which is the country code for the United States. A switch would realize that the endpoint associated with this address is located somewhere within the United States.

A customer having such an address could move anywhere within the United States without altering its AESA address. Preferably, switches throughout the United States would comprise a database indicating routing information associated with such AESA address.

Other address formats may be used. A DCC AESA or other format may be used. Of the conventional ATM formats, the ICD format offers the largest field for use by the administering entity, and is thus preferred.

The present invention provides for dynamic routing changes. For example, referring again to FIG. 1, assume that Brinson Laboratories has located a telephone at the endpoint shown as 48 and that the endpoint 42 has been assigned the following address: 47.0109.0.840.13.AA.be1111.000000.000000000000.00. As described above, the primary routing path from the Georgia-based switch 16 to the endpoint 48 is through the switches shown as 20 and 32. The database may be preprogrammed to provide a secondary routing scheme. For example, the database 17 associated with the switch shown as 16 may be programmed to provide routing information in response to a search for "be1111" that corresponds to forwarding the SETUP message to the switch shown as 18 in the event that the database is informed that the switch shown as 20 is, for example, malfunctioning or experiencing unusually heavy volume. Note that the switch 18 is coupled to the switch shown as 32. When the switch 16 examines a SETUP message comprising addressing information corresponding to the endpoint 48, the switch 16 will consult its database 17. If that database 17 has been previously informed that switch 20 is experiencing unusually heavy volume, the database will provide routing information to the switch corresponding to forwarding the message to the switch shown as 18. The switch 18 examines the message and consults its database 19 in relation to the addressing information contained therein. The database 19 provides the switch with routing information corresponding to forwarding the message to the switch shown as 32, which the switch 18 does. As above, the switch 32 examines the message, consults its database 33, and forwards the message to its corresponding endpoint 48.

Note that the routing information included in a database may provide more information than just the next switch to which the present switch should route the message. The routing information may provide information as to several successive switches to which the message should be forwarded. A database or look-up table may be preprogrammed with this information. For example, referring again to FIG. 1, when the Georgia-based switch 16 consults its associated database 17, the database may provide routing information to instruct that the SETUP message be forwarded to the endpoint 42 through switches 38 and 40. This instruction may, for example, be attached to the SETUP message or may be included in the message. In this way, switches 38 and 40 will not need to consult their associated databases or even be provided with databases. The database 17 may be programmed with alternate routing for messages for a particular address if the network can support alternate routing.

Figure 2:
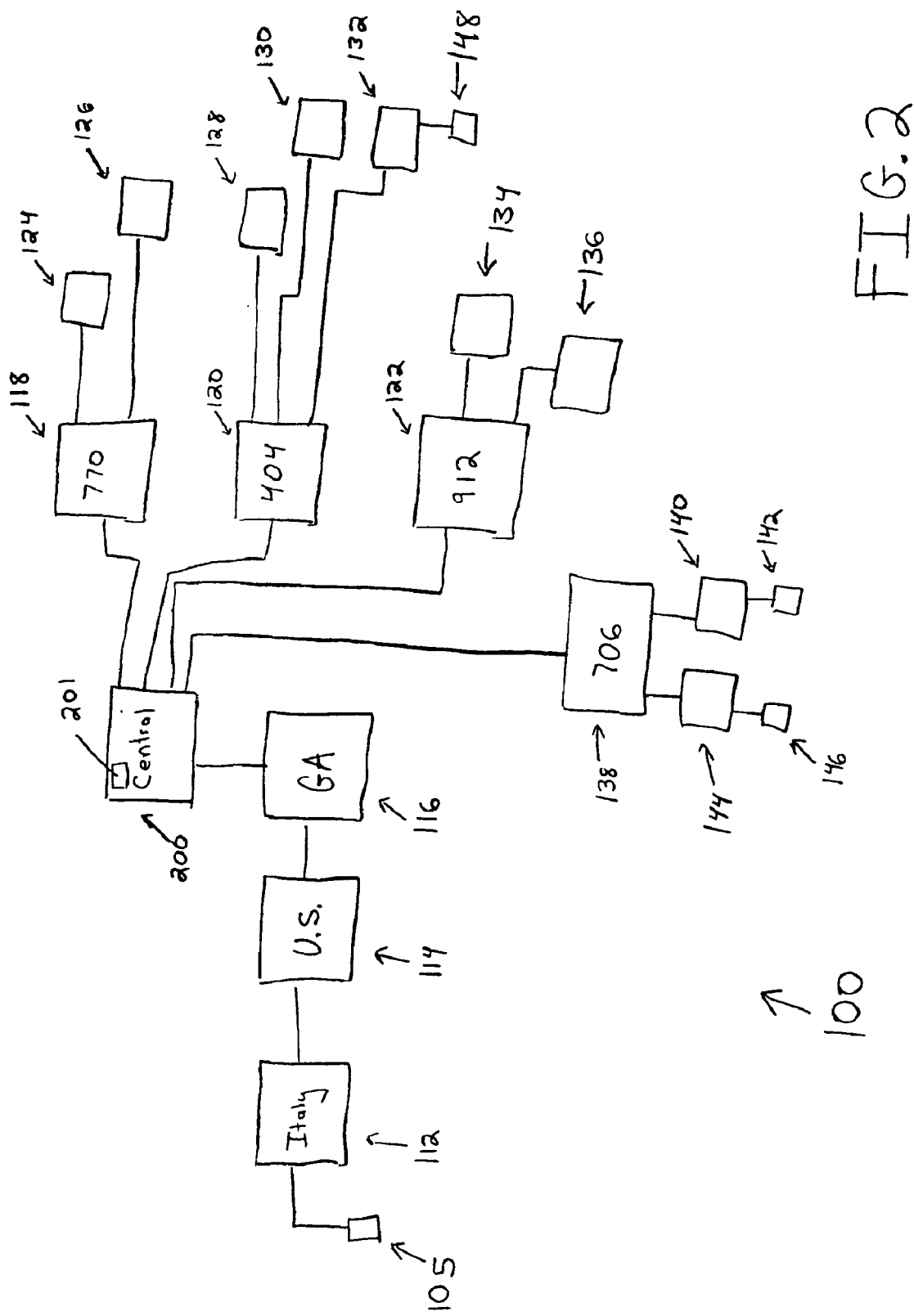
FIG. 2 is a block-diagram of an ATM telecommunications system according to the present invention having a centralized switch and database.

FIG. 2 shows a block diagram of another ATM Switched Virtual Connection (SVC) telecommunications network 100 according to the present invention. This network 100 differs from that shown in FIG. 1 in that a centralized switch comprises a database, and the search/look-up function is carried out in that centralized switch. An ATM device, in the shown case a telephone 105, is connected to an Italy-based switch 112. The device 105 wishes to establish a connection with an ATM device 142 and sends a signaling request to the Italy-based switch 112. This signaling request comprises a SETUP message which comprises an ICD AESA address associated with the ATM device, or customer. The address including the signaling request is as follows: 47.0109.0.840.13.AA.be1111.000000.000000000000.00. The switch 112 receives the SETUP message and examines the message. The switch recognizes that the address type is an ICD AESA because the AFI of the address is 47. The 0109 indicates BellSouth's network, and the 0 is an administrative field reserved for possible future BellSouth use. The switch recognizes that the country code of the AESA is 840, which corresponds to the United States. Once it recognizes that the address is a United States address, the Italy-based switch forwards the message to the switch 114 located in the United States. Like the Italy-based switch, this switch 112 examines the message. The switch 114 recognizes that the address type is ICD AESA because the AFI of the address is 47. The switch recognizes that the region or state code in the AESA is 13, which the switch recognizes corresponds to Georgia. Accordingly, the switch 114 forwards the message to a Georgia-based switch 116.

Like the switches before it, the Georgia-based switch 116 examines the SETUP message. The switch 116 recognizes that the code AA is present in the subregion field. The switch 116 recognizes that the code AA is a special code, letting the switch know that the address which the switch is examining is a special, scoped address The switch 116 recognizes that the endpoint, or point of attachment, associated with this address could be located in any subregion in Georgia. That is, from the code AA's presence in the subregion field, the switch 116 recognizes that it is to send the message to a central switch 200.

When the Georgia-based switch recognizes the AA code in the subregion field, the Georgia-based switch forwards the SETUP message to a central, scoped-based switch 200. This switch 200 is coupled to various switches 118, 120, 122, 138. Upon receiving the message, the switch 200 examines the message and a database 201 to determine routing information corresponding to the customer identification part of the received address, in this case, "be1111". The centralized database or look-up table may be located in any platform coupled to the network. The switch 200 finds this routing information in the database 201. The database 201 provides the switch 200 with routing information corresponding to the address which the switch is examining. The database 201 provides routing information indicating that the path to the endpoint associated with the examined address is through subregion 02 (the switch associated with the 706 area code), switch 01 within that subregion, at termination point 003B. The routing information provided indicates a route through switch 138 to switch 140 to the device 142. As the embodiment described above, the SETUP message is forwarded to the endpoint by the route indicated by the routing information.

Figure 3:
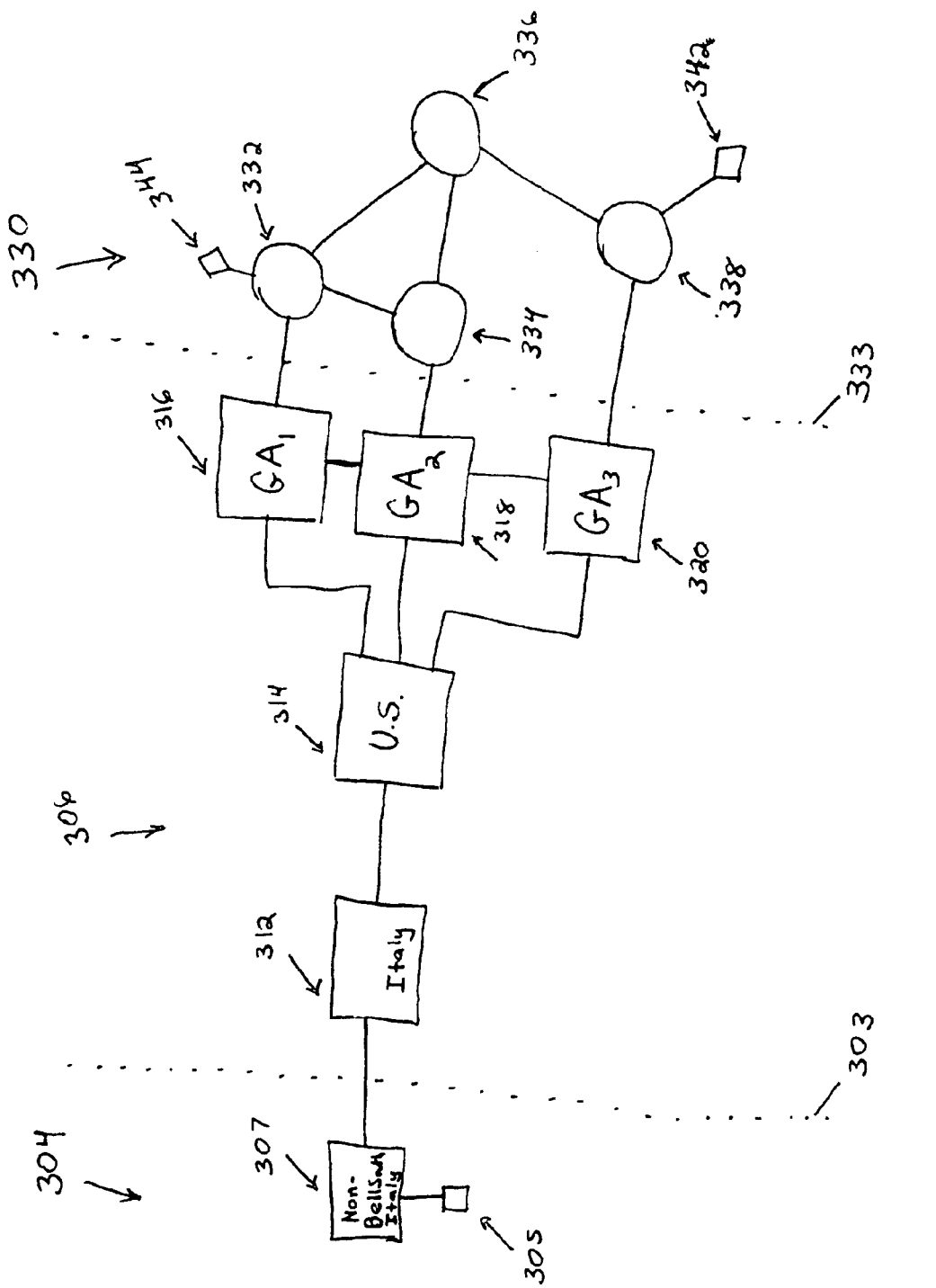
FIG. 3 is a block-diagram of an ATM telecommunications systems according to the present invention having a customer network coupled to a telecommunications network of one provider which is coupled to a telecommunications network of another provider.

FIG. 3 is a block-diagram of an ATM telecommunications system according to the present invention having a customer network 330 and a non-BellSouth network 304 coupled to a BellSouth network 306. The non-BellSouth network 304 is shown to the left of line 303. An ATM device, in the shown case a telephone 305, is connected to an Italy-based switch 307 in the network 304. The Italy-based switch 307 is not a BellSouth switch, but is owned and administered by another entity. A BellSouth network 306 includes an Italy-based switch 312 coupled to the non-BellSouth network 304, a United States (New York) based switch 314, and three Georgia-based switches 316, 318, 320. In this embodiment, the three Georgia-based switches 316, 318, 320 are coupled. The BellSouth network 306 is shown between the lines 303 and 333. A BellSouth customer, Brinson Laboratories, has its own network 330 (called a customer network). The customer network 330 includes several switches 332, 334, 336, 338. It is shown to the right of line 333. The customer network 330 is coupled to the BellSouth network by coupling between BellSouth switch 316 and customer-network switch 332, BellSouth switch 318 and customer-network switch 334, and BellSouth switch 320 and customer-network switch 338.

Brinson Laboratories has been assigned a block, or range, or addresses by BellSouth. That block of addresses is represented by the following prefix: 47.0109.0.840.13.AA.cc1234. The portion of the address shown as "cc1234" is the customer identification field. Note that the prefix does not include a customer field part.

The coupled networks operate substantially as described above. The device 305 wishes to establish a connection with device 342 at Brinson Laboratories. Device 342 has been assigned the following address: 47.0109.0.840.13.AA.cc1234.005678.1234567890ab.00. The 005678 portion is the customer part assigned to device 342 by Brinson Laboratories. The 123456789ab portion is the MAC address of device 342. The 00 portion is the selector field. Device 305 constructs and sends a SETUP message to the non-BellSouth Italy-based switch 307 comprising addressing information corresponding to the address cited in the previous paragraph. The Non-BellSouth switch 307 received the SETUP message and examines the called party address contained therein, which is 47.0109.0.840.13.AA.cc1234.005678.1234567890ab.00. The 0109 portion of the address indicates that the address is administered by BellSouth. The switch 307 has been previously programmed to forward all messages that are administered by BellSouth to switch 312. Upon recognizing the 0109 portion of the address, the non-BellSouth switch 307 forwards the message to a switch that is part of the BellSouth network 306, BellSouth switch 312. In the embodiment shown, the non-BellSouth switch is programmed to forward all messages including the 0109 code to switch 312. The switch 307 could be programmed to forward all messages including the 0109 code to the nearest BellSouth switch or to some other switch.

The BellSouth Italy-based switch 312 receives the SETUP message and examines it. The switch 312 recognizes that the country code of the AESA is 840, which corresponds to the United States. Once it recognizes that the address is a United States address, the switch 312 forwards the SETUP message to a switch 314 located in the United States. Like the switch before it, the switch 314 examines the message and recognizes that the region or state code in the AESA is 13, which the switch recognizes corresponds to Georgia. The switch 314 is programmed to send messages comprising a region or state code corresponding to Georgia generally to switch 318. The switch 314 is programmed, however, to send such messages to switch 316 if the volume of messages being sent to switch 318 over a given period of time is high or if there are transmission difficulties in sending messages to switch 318 or if switch 318 is under repair. Moreover, the switch 314 is programmed to send such messages to switch 320 if the volume of messages being sent to both switch 318 and switch 316 is unusually high or if there are transmission difficulties in sending messages to switch 318 or switch 316 or if switch 318 or switch 316 are under repair.

Switch 314 forwards the SETUP message to switch 318. Switch 318 examines the SETUP message. The switch 318 recognizes that the code AA is a scoped code, or an alert code, which alerts the switch 318 that the address which the switch is examining is a special, scoped address. The switch 318 recognizes that the customer which corresponds to the address which it is examining could be located anywhere in the state of Georgia. Upon this recognition, the switch 318 searches a database associated with it for the AESA, or for the customer identifier contained within the AESA, which it is examining. In this case, the switch 318 searches its associated database for "cc1234". The database associated with switch 318 has been preprogrammed to store and associate the customer identifier "cc1234" with routing information corresponding to forward the SETUP message to the nearest switch in the customer network associated with that customer identifier. That is, the switch has been preprogrammed to forward the SETUP message to the nearest Brinson Laboratories network switch, in this case switch 334. Upon retrieving this information and evaluating it, the switch 318 forwards the message to customer network switch 334. Of course, the switch 318 could be preprogrammed to forward the message to other switches in the customer's network besides the nearest customer network switch. However, by handing off the message to the nearest customer network switch, the customer gains access to the message as soon as possible and is given control over the message as soon as possible. This provides flexibility for the customer.

Once the SETUP message is handed off to the customer network by the BellSouth network, the message is forwarded based on the customer part of the address (005678.1234567890ab.00) as programmed by the customer in its own network. In other words, in this embodiment, the customer network is responsible for routing it to an endpoint such as a telephone based upon the customer part of the address.

For example, upon receipt of the SETUP message by customer network switch 334, the switch 334 forwards the message to switch 336, which in turn forwards the message to switch 338. Switch 338 recognizes the address included in the message as identifying device 342, and so delivers the SETUP message to device 342.

Notice that the message would have been delivered more efficiently if BellSouth switch 314 or BellSouth switch 318 had forwarded the message to BellSouth switch 320 instead of directly to Brinson Laboratories' network. However, because the last part of the address is a non-geographic organization-based address administered by Brinson Laboratories (not by BellSouth), BellSouth simply hands the message off to the nearest Brinson Laboratories switch. Thus, in the shown embodiment the BellSouth network hands the switch off to the customer network as soon as possible, providing flexibility to the customer.

For example, if the switch 314 had forwarded the message to switch 316, the switch 316 would hand off the message to the nearest customer network switch 332. If the switch 314 would have forwarded the message to switch 320, the switch 320 would have handed the message off to the nearest customer switch 338. As described above, the switch may be programmed to hand messages off to whichever customer network switch desired, but by handing the message off to the nearest customer network switch, the BellSouth network is able to provide the customer network with access to the message as soon as possible, and provides more flexibility to the customer network.

Notice also that Brinson Laboratories could move device 342 to another of its switches without changing device 342's address or impacting BellSouth's network. Routing table changes would be needed in Brinson Laboratories switches, but not in BellSouth switches in the embodiment shown.

Notice further that Brinson Laboratories could add more devices to its network without impacting BellSouth's network. The addresses for these devices would all share the Brinson Laboratories prefix, and Brinson Laboratories would assign the customer part of the address to the new devices.

Notice further that Brinson Laboratories could add switches to its network without the necessity of acquiring new addresses. In the embodiment shown, the routing tables in BellSouth switches would be impacted only if there were new interfaces to BellSouth's network.

An administrating entity may choose from a variety of geographic units in determining hierarchy for such AESAs. A address may include geographic codes using one or more of a variety of scope indicators, including: country code, state code, zip code, LATA codes, NPA codes, frame relay serving areas, and wire center/central office areas. In the preferred embodiment, at least country and state codes should be used. The other levels of geography for a chosen address scheme will depend upon a variety of factors, including switch distribution scheme. In the United States, a preferred embodiment includes, in addition to country and state codes, a LATA code and switch code.

There are other embodiments of the present invention. In one such embodiment, endpoints in a network according to the present invention may be preassigned fixed "network addresses," separate and apart from their addresses. The network address of an endpoint reflects the physical location of the endpoint on the network. Such a network operates in substantially the same way as the ones described above. In such a network, the databases include network address information corresponding to a scoped address. When a switch examines, for example, a SETUP message and consults a database regarding the customer identification, the forwarding information provided by the database comprises network address information. This network address information is then used by the switch to determine to which switch or other network element to forward the SETUP message.

Following the partial geographic information found in the addresses described above is a customer-specific identifier. Preferably, the customer identification will be unique within the domain, or scope, of the address. Also, preferably, the customer identification will be at least two (2) bytes in length for addresses of subregion, or LATA, scope; four (4) bytes in length for addresses of international, national, or, for example, southeastern region, scope; and three (3) bytes for addresses of state-wide scope. Such lengths should accommodate a sufficiently large number of different identifiers for a particular scope of geography.

The foregoing is provided for purposes of explanation and disclosure of a preferred embodiment of the present invention. Modifications of and adaptations to the described embodiment will be apparent to those of ordinary skill in the art of the present invention and may be made without departing from the scope or spirit of the invention and the following claims.

I claim:

1. In a telecommunication system, a process for addressing data comprising the steps of:
   a. providing a plurality of devices connected to the system,
      a first device having an address comprising a geographic portion and a non-geographic portion, said geographic portion comprising at least one geographic identifier to indicate the location of the first device within a predetermined geographic region, said non-geographic portion comprising a customer identifier, wherein said address of said first device comprises a scoped code; and
      a second device having the ability to construct a message to be transported in the telecommunications system;
   b. providing a plurality of switches having the ability to examine the message and to direct the message to other places in the telecommunications system;
   c. providing at least one database accessible by at least one of said switches, said database containing forwarding information corresponding to said address;
   d. in said second device, constructing the message, said message including addressing information corresponding to said address of said first device;
   e. transporting said message to a first switch for forwarding to a device corresponding to the addressing information;
   f. accessing the database to determine forwarding information corresponding to the addressing information; and
   g. forwarding the message to a device corresponding to said forwarding information.

2. The process of claim 1 wherein said forwarding information comprises routing information.

3. The process of claim 1 wherein said forwarding information comprises information regarding the physical location of said device corresponding to said forwarding information.

4. The process of claim 3 wherein said forwarding information comprises a network address.

5. The process of claim 1 further comprising the steps of:
   h. sending a setup message from said second device to said first device, wherein said setup message comprises said addressing information; and
   i. sending a connect message from the first of said devices to the second of said devices, wherein said connect message comprises information corresponding to the forwarding information corresponding to said first of said devices.

6. The process of claim 1 wherein said at least one geographic identifier comprises a plurality of geographic identifiers and said identifiers are arranged at least partly in geographically hierarchical relationship to each other in the hierarchical address.

7. The process of claim 1, wherein said at least one geographic identifier comprises the scoped code, wherein a virtual connection is established between the first of said devices and the second of said devices.

8. The process of claim 7 wherein said database is a look-up table.

9. The process of claim 8 wherein said transporting is carried out using Asynchronous Transfer Mode standard of communication.

10. The process of claim 9 wherein said address is in an Asynchronous Transfer Mode format.

11. The process of claim 10 wherein said database is located in at least one of said switches.

12. The process of claim 10 wherein said database is located in a platform.

13. The process of claim 12 wherein said platform is remote from said plurality of switches.

14. The process of claim 1 wherein said message comprises digital units.

15. A telecommunications system, comprising:
    a first device connected to the system, said first device having an address comprising a geographic portion and a non-geographic portion, said geographic portion comprising at least one geographic identifier to indicate the location of the first device within a predetermined region, said non-geographic portion comprising a customer identifier, wherein said address of said first device comprises a scoped code;
    a second device connected to the system, said second device having the ability to construct a message comprising addressing information to be transported in the telecommunications system;
    a plurality of switches, each having the ability to examine the message and to forward the message to other places in the telecommunications system;
    at least one database accessible by at least one of said switches, said database containing forwarding information corresponding to said addressing information;
    wherein at least one of said switches forwards the message according to said forwarding information.

16. The system of claim 15 wherein said forwarding information comprises routing information.

17. The system of claim 15 wherein said forwarding information comprises information regarding the physical location of said first device.

18. The system of claim 17 wherein said forwarding information comprises a network address.

19. The system of claim 17 wherein the second device, information is converted into a plurality of digital units.

20. The system of claim 19 wherein said message is transported to a first switch for further transport to said first device.

21. The system of claim 20 wherein at least one database is accessed to determine forwarding information corresponding to said addressing information.

22. The system of claim 21 wherein said message is transported to a device corresponding to said forwarding information.

23. The system of claim 22 wherein said second device sends a setup message to a first of said devices, wherein said setup message comprises addressing information corresponding to said first device.

24. The system of claim 23 wherein said first device sends a connect message to said second device, wherein said connect message comprises information corresponding to forwarding information corresponding to said first device.

25. The system of claim 24 wherein a virtual connection is established between the first device and the second device.

26. The system of claim 25 wherein said message comprises digital units.

27. A telecommunications system, comprising:
    a first network comprising a first switch, said first network having an address comprising a geographic portion and a non-geographic portion, said geographic portion comprising at least one geographic identifier to indicate the location of said first network within a predetermined region, said non-geographic portion comprising a customer identifier, wherein said address of said first device comprises a scoped code;

a second network comprising a second switch and a third switch, said second switch for forwarding a message comprising addressing information to said third switch, said third switch coupled to said first network said third switch for forwarding a message to said first network;

at least one database accessible by said third switch, said database containing forwarding information corresponding to said addressing information.

28. The system of claim 27 wherein said first network further comprises a fourth switch and wherein said forwarding information corresponds to forwarding said message to the physically nearest of said first and fourth switches.

29. The system of claim 27, wherein said at least one geographic identifier comprises the scoped code, wherein said second device is in a network.

30. The system of claim 25 wherein said transporting is carried our using Asynchronous Transfer Mode standard of communication.

31. The system of claim 29 wherein said forwarding is carried our using Asynchronous Transfer Mode standard of communication.

32. A telecommunication device having an address, the address comprising:

a non-geographic portion including a customer identification;

a geographic portion comprising a geographic identifier, the geographic identifier being indicative of the location of the telecommunication device, the geographic identifier including a scoped code.

33. A telecommunication system comprising:

a plurality of telecommunication devices;

an address associated with each of the telecommunication devices, each address comprising a non-geographic portion having a customer identification, each address further comprising a geographic portion indicative of the location of the telecommunication device, the geographic portion comprising a geographic identifier, the geographic identifier including a scoped code.

34. In a telecommunication device having an address, a process comprising the steps of:

including a non-geographic portion in the address, the non-geographic portion including a customer identification; and including a geographic portion in the address, the geographic portion comprising a geographic identifier, the geographic identifier being indicative of the location of the telecommunication device, the geographic identifier including a scoped code.

35. In a telecommunication system having telecommunication devices, each telecommunication device having an address, a process comprising the steps of:

including a non-geographic portion in each address, the non-geographic portion including a customer identification; and including a geographic portion in each address, the geographic portion comprising a geographic identifier, the geographic identifier being indicative of the location of the telecommunication device, the geographic identifier including a scoped code.

36. The telecommunication device of claim 32, wherein the telecommunication device is configured to operate in an Asynchronous Transfer Mode (ATM) network.

37. The telecommunication device in claim 32, wherein the address is configured to be recognized by at least one switch coupled to the telecommunication device.

38. The telecommunication device of claim 32, wherein the telecommunication device is configured to operate in a virtual connections network.

39. The telecommunication system of claim 33, wherein at least one the telecommunication devices is configured to operate in an Asynchronous Transfer Mode (ATM) network.

40. The telecommunication system of claim 33, wherein the address is configured to be recognized by at least one switch coupled to at least one of the telecommunication devices.

41. The telecommunication system of claim 33, wherein at least one of the telecommunication devices is configured to operate in a virtual connections network.

42. The process of claim 34, wherein the telecommunication device is configured to operate in an Asynchronous Transfer Mode (ATM) network.

43. The process of claim 34, wherein the address is configured to be recognized by at least one switch coupled to the telecommunication device.

44. The process of claim 34, wherein telecommunication device is configured to operate in a virtual connections network.

* * * * *